July 22, 1930.  D. T. WADSWORTH  1,771,005
UNIVERSAL END WALL FOR SWITCH BOXES AND THE LIKE
Filed Sept. 14, 1926
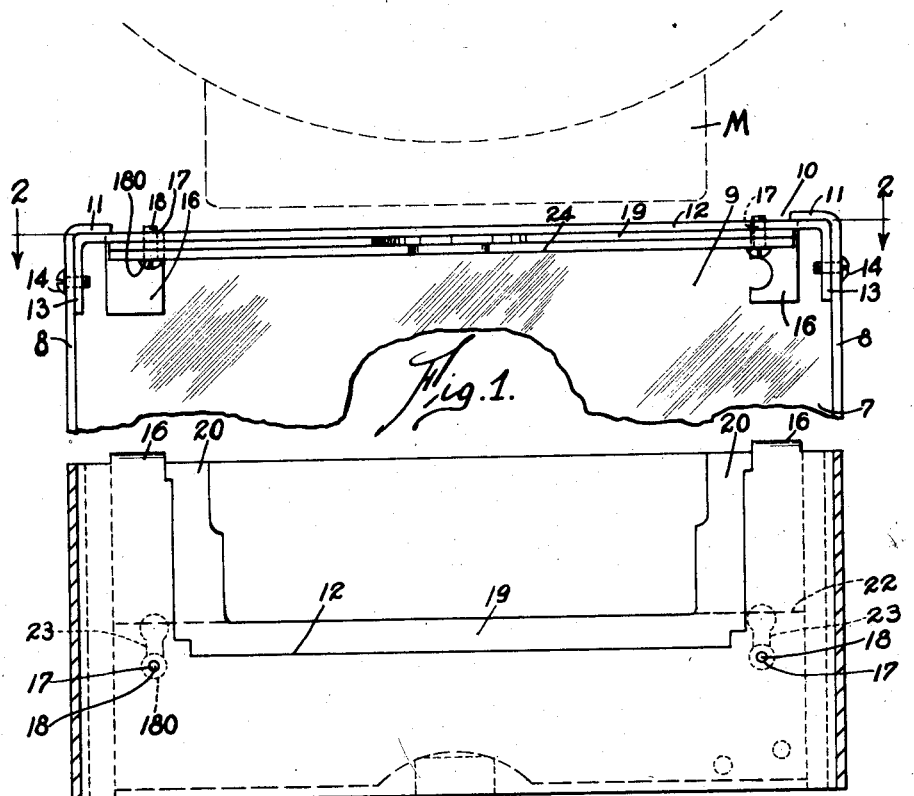
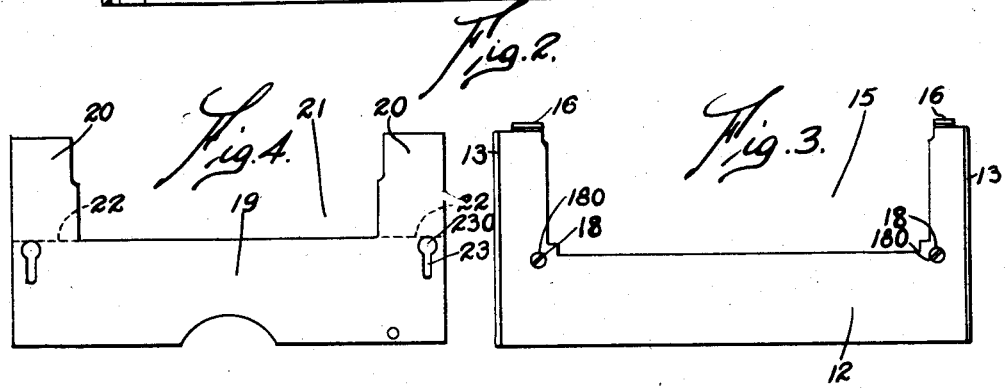
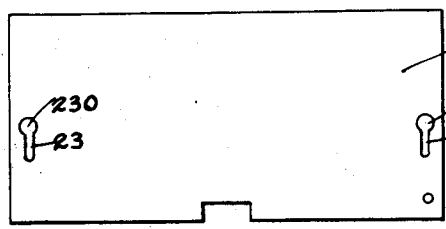
Inventor
David T. Wadsworth,
By Murray and Gugelter
Attorneys Patented July 22, 1930

1,771,005

UNITED STATES PATENT OFFICE

DAVID T. WADSWORTH, OF COLD SPRINGS, KENTUCKY, ASSIGNOR TO THE WADSWORTH ELECTRIC MANUFACTURING COMPANY, OF COVINGTON, KENTUCKY, A CORPORATION OF KENTUCKY

UNIVERSAL END WALL FOR SWITCH BOXES AND THE LIKE

Application filed September 14, 1926. Serial No. 135,458.

This invention relates to end wall structures for switch boxes and the like and has for an object the provision of a structure which will accommodate any of a number of electric meters commonly used.

Another object is to provide a meter-adapting-end wall which is rigid of structure and so arranged as to permit of removal and breaking away of sections to accommodate a given meter.

Another object is to provide a removable closing plate which is interchangeable and adapted to reuse and replacement.

Another object is to provide a device of this kind in which removal and insertion of parts may be accomplished without removal of screws.

These and other objects are attained by the means described herein and disclosed in the accompanying drawings, in which:

Fig. 1 is a fragmentary front elevational view of the switch box having assembled therein a complete end wall structure of my invention.

Fig. 2 is a view taken on line 2—2 of Fig. 1.

Fig. 3 is a plan view of a frame structure forming a part of my invention.

Fig. 4 is a plan view of an insert for the frame structure.

Fig. 5 is a plan view of a removable closing plate forming a detail of my invention.

A switch box 7, having side walls 8 and rear wall 9, has an open end 10, over which extend flanges 11 formed by drawing inwardly the ends of side walls 8. In use, the switch box 7 may have one of a number of types of electric meters "M" connected thereto at its open end 10.

The end wall of my invention is universal in its adaptability to presently used types and shapes of meters. To this end I provide a frame 12, having flanged sides 13, for mounting upon faces of side walls of the switch box at the open end 10.

The body of the frame 12 may abut the flanges 11 of the switch box, and screws 14 passing through clearance holes in side walls 8 and tapped holes in flanges 13, serve to secure the frame rigidly to the box. It will be apperent that the flanges 11 may be omitted from the switch box side walls and that the frame may be secured in position solely by screws, or it may be secured by any other suitable means. The frame 12 is cut away to provide an aperture 15 of such size and shape as to receive the largest of commonly used electric meters.

The frame body 12 is generally U-shaped in plan and carries upturned lugs 16 which are disposed on opposite sides of the aperture 15, and abut the rear wall 9 of the switch box when the frame is assembled therein. The frame has a pair of tapped holes therein which are preferably disposed adjacent the inner corners of aperture 15, screws 18 are placed in the holes 17 with the heads 180 disposed interiorly of the switch box.

An adapter plate 19 comprises a flat sheet of material having arms 20 providing between them an aperture 21 which is of a size and shape adapted to receive a meter of a size smaller than the first mentioned one. Portions of the arms 20 overhang the aperture 15 in the frame. The plate 19 is scored or cut along line 22 so that the arms 20 may be easily broken off to provide a substantially straight edge across one side of plate 19.

Keyhole slots 23 are provided to receive screws 18, the enlarged openings 230 of such slots receiving the heads 180 of the screws.

A closing plate 24 comprises a flat substantially rectangular plate having keyhole slots 23 which coincide with the slots in plate 19 when the plates are superimposed one upon the other.

When plates 19 and 24 are to be assembled on frame 12, the screws 18 are loosened but not removed from frame 12, whereupon the plate 19 is positioned over the frame to permit screw heads 180 to pass through enlarged bores 230 of the slots 23.

The plate 19 is then slid transversely of the frame so that the shanks of the screws 18 enter slots 23. Closing plate 240 is in a like manner mounted upon plate 19, whereupon screws may be tightened and the frame and its removable portions rigidly screwed together. This structure forms a solid end closure for switchbox 7 and precludes entry of foreign matter into the boxes while being installed on a job.

When the box is ready for meter connections, screws 18 are loosened and closing plate 24 is removed by sliding it until aperture or bores 230 coincide with the screw heads 180, whereupon the plate may be lifted from the frame.

It is a matter of great convenience to be able to remove the plate without separating the screws from the frame because of the danger of losing the screws in a mass of débris or a coal pile.

When the closing plate 24 is removed, the box has a meter opening for receiving the smallest of the presently used meters. Should a larger size meter be specified, the adapted plate 19 would have the arms 20 broken off to provide a larger opening. The largest size of meter may be readily accommodated by entirely removing the adapter plate 19.

The closing plates 24 are interchangeable and may be replaced in a switch box in the event that the meter is to be removed. It should also be noted that the adapted plate 19 may be used to advantage where the style or size of meter is changed after the initial meter installation. In no instance is it necessary to use a saw or chisel to change the shape of the meter opening. The plates are inexpensive and easily replaced in the event of loss.

While I have shown herein a universal end wall structure which will accommodate the most popular electric meters now in use, I do not desire to limit my invention to the exact structure shown as it will be readily observed that additional plates having apertures of different sizes and shapes may be added within the scope and spirit of this invention. Such other modifications may be had without sacrificing any of the advantages inherent in the device of my invention.

What I claim is:

A meter adapting device for switch boxes and the like comprising a removable end wall having a substantially rectangular cut out portion extending from one side thereof, and a separable U-shaped plate having a body portion and spaced arms proportioned to overhang the three edges of the said cut out portion in the end wall for reducing the effective size of the cut out portion, the arms on the U-shaped plate being scored along the line of the body of the plate and readily removable whereby to increase the length of the effective size of the cut out portion while the width remains unchanged.

In testimony whereof, I have hereunto subscribed my name this 1st day of September, 1926.

DAVID T. WADSWORTH.